United States Patent [19]

Abbatiello et al.

[11] 4,122,351
[45] Oct. 24, 1978

[54] AUTOMATIC TARGETING OF PLASMA SPRAY GUN

[75] Inventors: Leonard A. Abbatiello, Oak Ridge; Richard E. Neal, Heiskell, both of Tenn.

[73] Assignee: The United States of America as represented by the United States Department of Energy, Washington, D.C.

[21] Appl. No.: 829,123

[22] Filed: Aug. 30, 1977

[51] Int. Cl.² ............................................. G01N 21/58
[52] U.S. Cl. .................................... 250/554; 250/215
[58] Field of Search ............... 250/201, 554, 203, 215, 250/222, 238, 216; 356/187; 315/111.2; 340/228 R, 227 R

[56] References Cited

U.S. PATENT DOCUMENTS

| | | | |
|---|---|---|---|
| 3,567,901 | 3/1971 | Deininger et al. | 250/554 |
| 3,967,255 | 6/1976 | Oliver et al. | 340/227 R |

*Primary Examiner*—David C. Nelms
*Attorney, Agent, or Firm*—Dean E. Carlson; Stephen D. Hamel

[57] ABSTRACT

A means for monitoring the material portion in the flame of a plasma spray gun during spraying operations is provided. A collimated detector, sensitive to certain wavelengths of light emission, is used to locate the centroid of the material with each pass of the gun. The response from the detector is then relayed to the gun controller to be used to automatically realign the gun.

3 Claims, 3 Drawing Figures

AUTOMATIC TARGETING OF PLASMA SPRAY GUN

BACKGROUND OF THE INVENTION

This invention was made in the course of, or under, a contract with the U.S. Energy Research and Development Administration.

Plasma spraying is a method of material application that consists of the insertion of metallic powders into an ionized gas flame. Uniform coatings of these spray materials are applied to surfaces of revolution by operating the plasma gun under numerical contouring control at a fixed standoff from the surface. In regions where the contour is changing, the uniformity of the coating is highly sensitive to misalignment of the gun. Therefore, to achieve a uniform layer, it is essential that the centroid of the material spot be located at the command spot at the proper time.

In conventional plasma spraying, alignment is accomplished by directing the flame onto a graphite target at a known location and manually adjusting the gun for proper centering of the material spot before each operation. This method has several drawbacks in that it provides no in-process control, it is very time consuming, and it requires frequent process interruption.

Thus, there exists a need for a system wherein the material pattern of the gun can be monitored during actual spraying operations and corrections in pattern location can be made without interrupting the spraying process. The present invention was conceived to meet this need in a manner to be described hereinbelow.

SUMMARY OF THE INVENTION

It is the object of the present invention to provide a system for monitoring the material pattern of a plasma spray gun during the operation thereof and utilizing such for effecting the necessary corrections in the pattern location to thus provide a uniform coating upon a part being coated without interrupting the spraying process.

The above object has been accomplished in the present invention by providing a system and method for monitoring the material pattern of the flame of a plasma spray gun and automatically aligning the gun during the coating of a sample part, said gun having a digital control means which comprises:

(a) a material detector located in a direction normal to the flame during gun travel and having an output that is a qualitative indication of the presence of material in the flame;

(b) an analog-to-digital converter for converting the output from the detector to a digital control signal to be fed into said control means;

(c) gating means controlled by said control means for regulating the output from said detector to said converter such that said converter will receive a plurality of pulses during a predetermined time interval each time the gun passes in range of the detector; and (d) means in said digital control means for comparing said converter digital control signal with a desired maximum response signal stored in said control means, and utilizing any difference therebetween for automatically adjusting the position of said gun and thus the material pattern of said flame until such difference is nulled for each occurrence of said digital control signal.

DESCRIPTION OF THE PREFERRED EMBODIMENT

Figure 1:
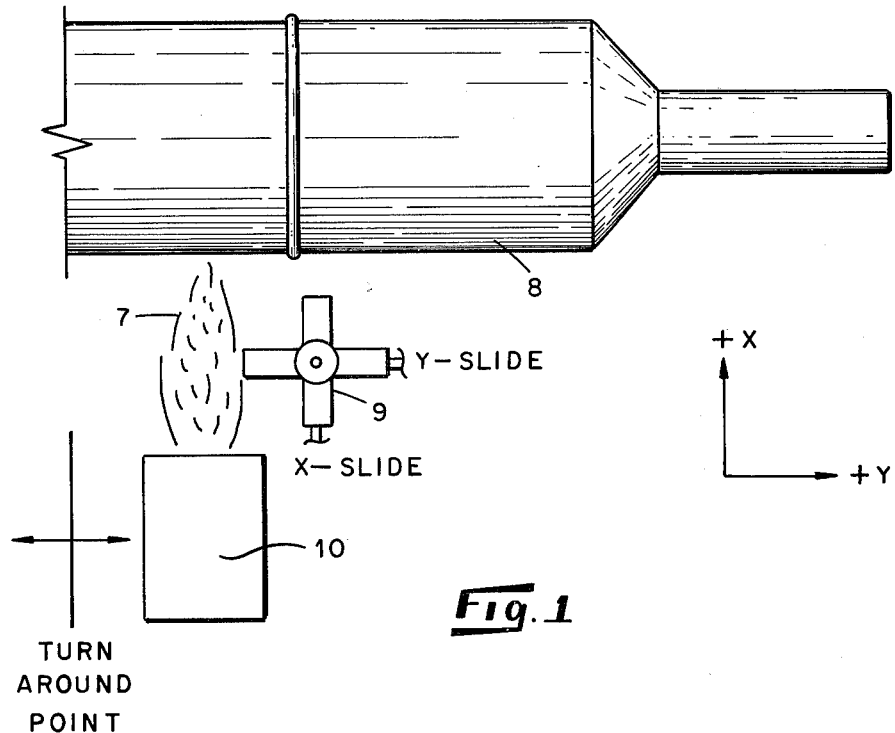
FIG. 1 is a schematic illustration of the location of the material detector with respect to the flame of a plasma spray gun.

FIG. 1 illustrates the location of a material detector 9 with respect to the flame 7 of a plasma spray gun 10. The spray flame 7 of the gun 10 is utilized to impinge upon a part 8 to be coated while the part 8 is adapted to be rotated by means, not shown, and the position of the gun 10 is under numerical contouring control which position is automatically adjusted by means of signals from the detector 9 in a manner to be described hereinbelow. The position of the detector 9 is below the axis of rotation of the part 8 and the flame 7 is directed normal to said axis. The collimated detector 9 thus is mounted in a position normal to both the direction of plasma gun travel and to the flame 7 of the plasma spray gun 10 for each pass thereof over said detector. The output of the detector 9 is therefore a normally distributed response for each pass of the flame over the detector.

Figure 2:
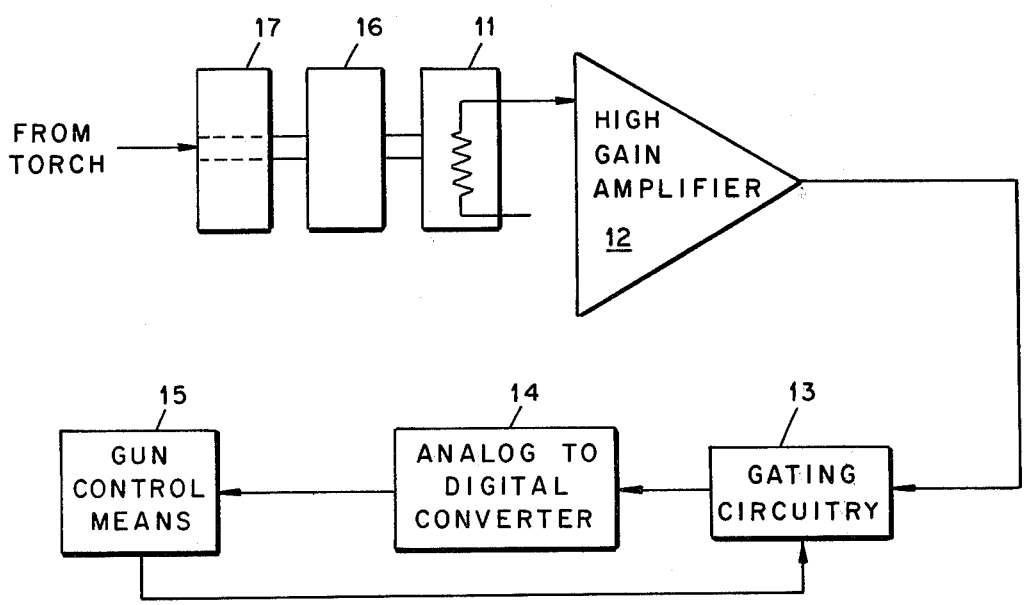
FIG. 2 is a block diagram of the control system of the present invention illustrating the interface of the system with a typical plasma spraying control center.

The preferred material detecting device is a photocell 11 as illustrated in FIG. 2 of the drawings. The light incident upon the photocell 11 from the plasma spray gun torch (flame) is collimated by a collimator 17 and is filtered by an interference filter 16 with a characteristic wavelength corresponding to that of the spectral lines emitted by the excited material particles in the plasma flame. The filter 16 was chosen to be in the ultraviolet region to block light from the flame but allow emissions from the specific material utilized in the flame. Inherent flexibility exists because the spectral lines of different materials may be accommodated by the same filter. The filter 16 was constructed to have a peak wavelength at 3305 Å with a ½ bandwidth of less than 300 Å, for example. It should be understood that thermocouple or similar device instead of a collimated photocell could be utilized as a flame detector if such were desired.

The output from the photocell 11 is fed into a high gain amplifier 12. The amplifier 12 is a saturating-type amplifier utilizing 2N3904 transistors, for example. The signal from the amplifier 12 is then fed into a gating circuit 13 which is designed so that a series of three instantaneous response readings from the amplifier 12 are fed into an analog-to-digital converter 14 in 150 m sec. time intervals. The gating circuitry 13 utilizes 24 DEC flip chip modules, and the analog-to-digital converter 14 is a DEC model A-811, for example. The output from the converter 14 is then fed into a gun control means 15. The gun control means 15 includes a DEC PDP 8 computer, for example. The gating control is accomplished by inserting a marker in the gun control tape at the approximate position of the optical detector and utilizing the marker for controlling the circuitry 13.

In order to initially set-up the monitoring system, the amplified response and the marker are monitored by a chart recorder and, with the process operating after manual alignment, the detector position is adjusted until the maximum response occurs at the point of marker assertion. After this calibration procedure has been effected, the properly aligned gun should maintain this response-marker correlation and need not be checked again for roughly 30 hours of machine operation under normal circumstances.

Figure 3:
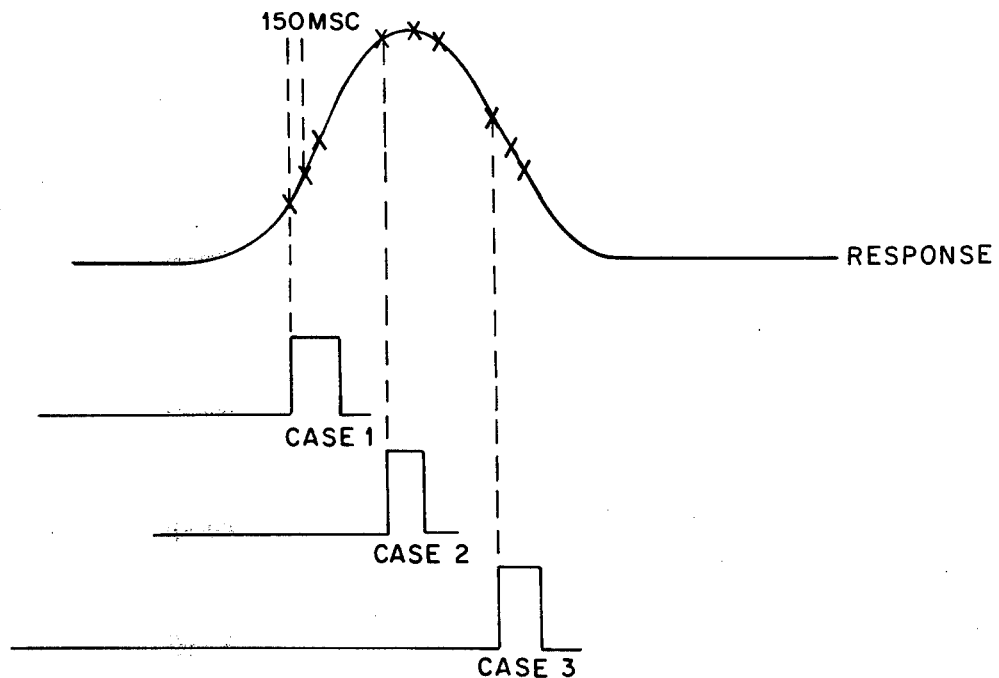
FIG. 3 is a graph illustrating three possible responses which can be detected by the system of the present invention.

Under normal operating conditions, each time the marker is asserted, three response values are provided and read into the computer of the control means 15 at 150 m sec intervals and are compared with the desired maximum response such that any deviation therefrom provides the proper control signals for the automatic repositioning of the plasma spray gun for correction of any such deviation. Three possible conclusions that can be made from the response values are demonstrated in FIG. 3 of the drawings. Case 1 demonstrates an increasing response. This means that the mark is occurring before the response has reached its maximum and, therefore, the gun is lagging its commanded position. To correct this situation the start of the next pass is automatically shifted forward 0.100 inch. The second case demonstrates the marker occurrence at the maximum response level as intended and desired. Therefore, no correction is necessary or effected. The three values stored in case 3 represent a negative slope which means that the gun has passed the alignment position before the marker is asserted. The mass centroid of the material in the flame is leading the desired position so the start of the gun is automatically shifted 0.100 inch in the reverse $y$ direction. A misaligned gun is thus automatically brought into alignment by this method in two or three passes after which the stability and occasional oscillation about the maximum point is realized.

This invention has been described by way of illustration rather than by limitation and it should be understood that it is equally applicable in fields other than those described.

What is claimed is:

1. A method for monitoring the material pattern of the flame of a plasma spray gun and automatically aligning said gun and thus said flame during the coating of a rotating sample part, said gun having a digital control means, comprising the steps of detecting said material pattern of said flame with a light detection means located in a direction normal to said flame during gun travel to provide an output that is a qualitative indication of the presence of said material in said flame, converting said detection means output with an analog-to-digital converter to a digital control signal; regulating the detection means output to the converter with a gating means to provide a plurality of pulses to the converter for conversion to said digital control signal during a predetermined time interval each time the gun passes in range of said detection means; controlling said gating means with a marker signal from said digital control means; comparing said digital control signal from said converter each time it occurs with a desired maximum response signal stored in said digital control means; and utilizing any difference in said digital control signal and said maximum response signal for automatically adjusting the position of said gun and thus the material pattern of said flame until said difference is nulled for each occurence of said digital control signal, whereby said sample part is provided with a uniform coating.

2. The method set forth in claim 1, and further including the step of filtering the light incident upon said detection means with an interference filter in the ultraviolet region.

3. The method set forth in claim 2, wherein the number of said pulses gated to said converter for each pass of said gun is three pulses in 150 m sec time intervals.

* * * * *